United States Patent
Danskin et al.

(10) Patent No.: US 8,327,071 B1
(45) Date of Patent: Dec. 4, 2012

(54) INTERPROCESSOR DIRECT CACHE WRITES

(75) Inventors: John M. Danskin, Providence, RI (US); Emmett M. Kilgariff, San Jose, CA (US); David B. Glasco, Austin, TX (US); Sean J. Treichler, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 692 days.

(21) Appl. No.: 11/939,528

(22) Filed: Nov. 13, 2007

(51) Int. Cl.
*G06F 12/00* (2006.01)

(52) U.S. Cl. .................. 711/122; 711/121; 345/557

(58) Field of Classification Search .................. None
See application file for complete search history.

(56) References Cited

U.S. PATENT DOCUMENTS

| | | | |
|---|---|---|---|
| 5,003,459 A * | 3/1991 | Ramanujan et al. | 711/3 |
| 6,956,579 B1 * | 10/2005 | Diard et al. | 345/537 |
| 7,076,551 B2 * | 7/2006 | Gary | 709/226 |
| 7,596,662 B2 * | 9/2009 | Makineni et al. | 711/122 |
| 2007/0198948 A1 * | 8/2007 | Toriyama | 715/790 |
| 2008/0133844 A1 * | 6/2008 | Ramani et al. | 711/146 |

OTHER PUBLICATIONS

Eggers, et al. "Simultaneous Multithreading: A Platform for Next-Generation Processors," *IEEE Micro*, vol. 17, No. 5, pp. 12-19, Sep./Oct. 1997.

* cited by examiner

*Primary Examiner* — Charles Rones
*Assistant Examiner* — Baboucarr Faal
(74) *Attorney, Agent, or Firm* — Patterson & Sheridan, LLP

(57) ABSTRACT

In a multiprocessor system level 2 caches are positioned on the memory side of a routing crossbar rather than on the processor side of the routing crossbar. This configuration permits the processors to store messages directly into each other's caches rather than into system memory or their own coherent caches. Therefore, inter-processor communication latency is reduced.

20 Claims, 6 Drawing Sheets

INTERPROCESSOR DIRECT CACHE WRITES

BACKGROUND OF THE INVENTION

1. Field of the Invention

The present invention generally relates to caching and more specifically to a multiprocessor system with caching on the memory side of a routing crossbar.

2. Description of the Related Art

Current multiprocessor systems include level 2 (L2) caches that are directly coupled to each processor. This configuration allows each processor to snoop writes to the caches of the other processors in the system and to access the caches with low latency compared with the number of clock cycles needed to retrieve data from system memory. System memory is typically accessed through a bridge device e.g., a Northbridge chip, and is shared with other devices in the system that are also coupled to the bridge device.

As the number of processors in multiprocessor systems increases, the complexity of the snooping and accessing of caches that are coupled to other processors increases. Therefore, the complexity and access latency increases as the parallelism increases.

Accordingly, what is needed in the art is a system and method for configuring caches in a multiprocessor system that allows for increased parallelism without increasing complexity and cache access latency.

SUMMARY OF THE INVENTION

In a multiprocessor system L2 caches are positioned on the memory side of a routing crossbar rather than on the processor side of the routing crossbar. This configuration permits the processors to store messages directly into each other's caches rather than into system memory or their own coherent caches. Therefore inter-processor communication latency is reduced. Processor parallelism may be increased by adding processors and corresponding L2 caches to the routing crossbar to improve overall system processing throughput without increasing the complexity of accessing the L2 caches. Each processor may access a cache line in any one of the L2 caches by determining the correct memory controller based on the physical cache line address and then issuing a request directly to that memory controller using the available routing fabric. Therefore, cache misses are not broadcast to all of the memory controllers. Additionally, a central processing unit (CPU) may write data to the L2 caches of the multiprocessor system and one or more of the processors in the multiprocessor system can read the data from the L2 caches. The number of clock cycles need to transfer data from the CPU to the processors in the multiprocessor system is reduced compared with other transfer mechanisms, such as having the processors read from the CPU system memory or an L2 cache coupled to the CPU or having the CPU write to the multiprocessor system memory.

Various embodiments of a method of the invention for transmitting messages in a multiprocessor system include outputting a message produced by a central processing unit (CPU) to a level 2 cache of a processing core, translating a virtual address corresponding to the message into a physical address corresponding to a location in a processing core memory that is coupled to the level 2 cache, storing the message and at least a portion of the physical address in the level 2 cache, updating a ready value to indicate that the message is available in the level 2 cache, and reading the message from the level 2 cache by the processing core.

Various embodiments of the invention for a multiprocessor system that includes a parallel processing unit and a central processing unit (CPU). The parallel processing unit includes a plurality of processing cores configured to execute instructions to process data, a parallel processing memory configured to store messages including the instructions and the data, a plurality of level 2 caches that are coupled to the parallel processing memory and configured to store the messages, and a memory crossbar that is coupled between the plurality of processing cores and the plurality of level 2 caches and configured to route the messages between each one of the processing cores and each one of the level 2 caches. The CPU is configured to produce the messages and write the messages to the plurality of level 2 caches.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
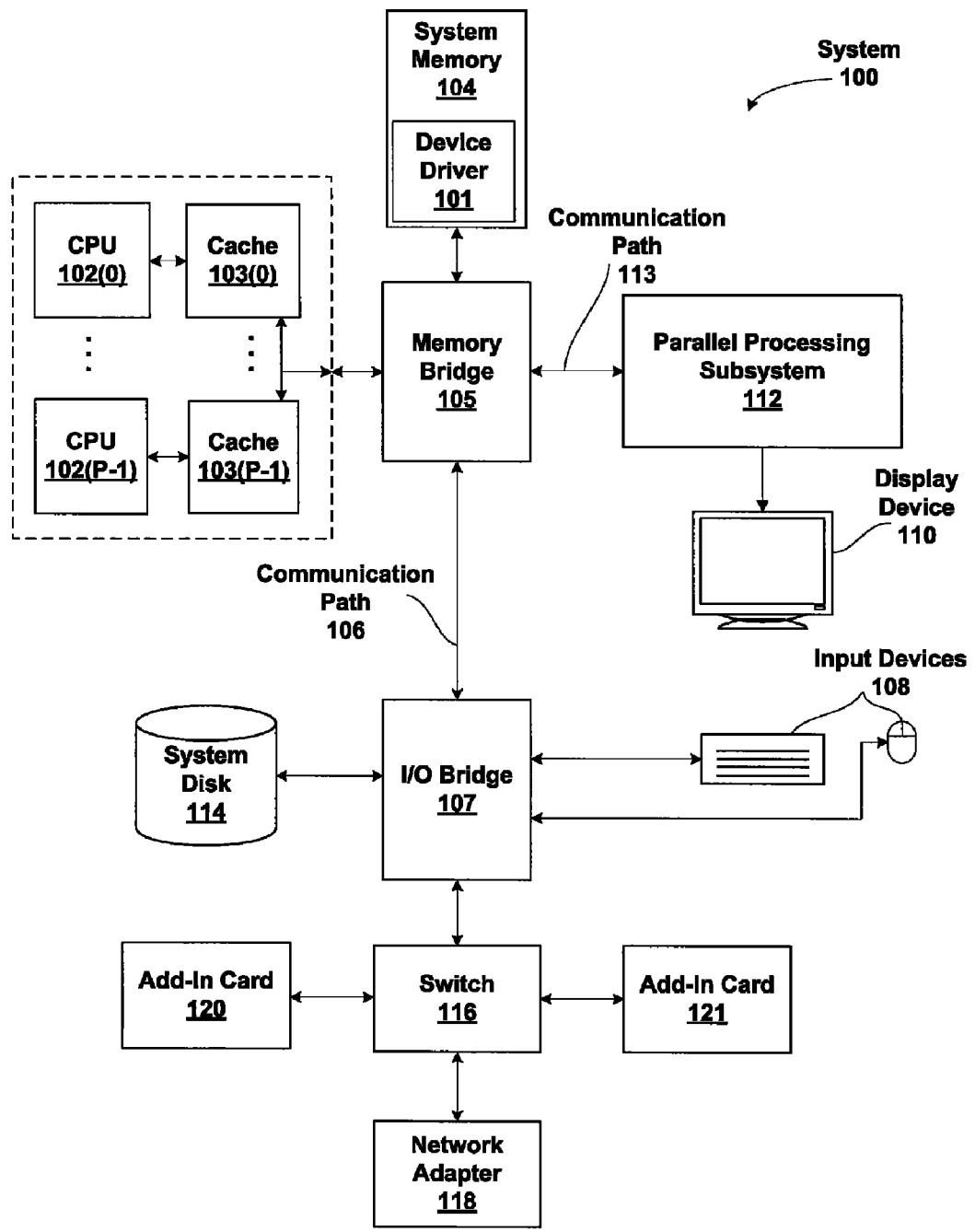
FIG. 1 is a block diagram illustrating a computer system configured to implement one or more aspects of the present invention.

FIG. 1 is a block diagram illustrating a computer system configured to implement one or more aspects of the present invention. FIG. 1 is a block diagram of a computer system 100 according to an embodiment of the present invention. Computer system 100 includes one or more central processing units (CPU) 102, caches 103, and a system memory 104 communicating via a bus path that includes a memory bridge 105. In general, a computer system 100 includes a number P of CPUs and caches, where P≧1. (Herein, multiple instances of like objects are denoted with reference numbers identifying the object and parenthetical numbers identifying the instance where needed.) CPUs 102 and caches 103 may be implemented, e.g., using one or more integrated circuit devices such as programmable processors, application specific integrated circuits (ASICs), and memory devices.

System memory 104 includes a device driver 101 that is configured to provide one or more messages that specify the data and program instructions for processing by parallel processing subsystem 112. The messages may be stored in system memory 104, caches 103, or memory within other devices of system 100. Device driver 101 is executed by CPUs 102 to translate instructions for execution by parallel processing subsystem 112 based on the specific capabilities of parallel processing subsystem 112. The instructions may be specified by an application programming interface (API) which may be a conventional graphics API such as Direct3D or OpenGL.

Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPUs 102 via communication path 106 and memory bridge 105. A parallel processing subsystem 112 is coupled to memory bridge 105 via a bus or other communication path 113 (e.g., a PCI Express, Accelerated Graphics Port, or HyperTransport link). In one embodiment parallel processing subsystem 112 is a graphics subsystem that delivers pixels to a display device 110 (e.g., a conventional CRT or LCD based monitor).

A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

Figure 2:
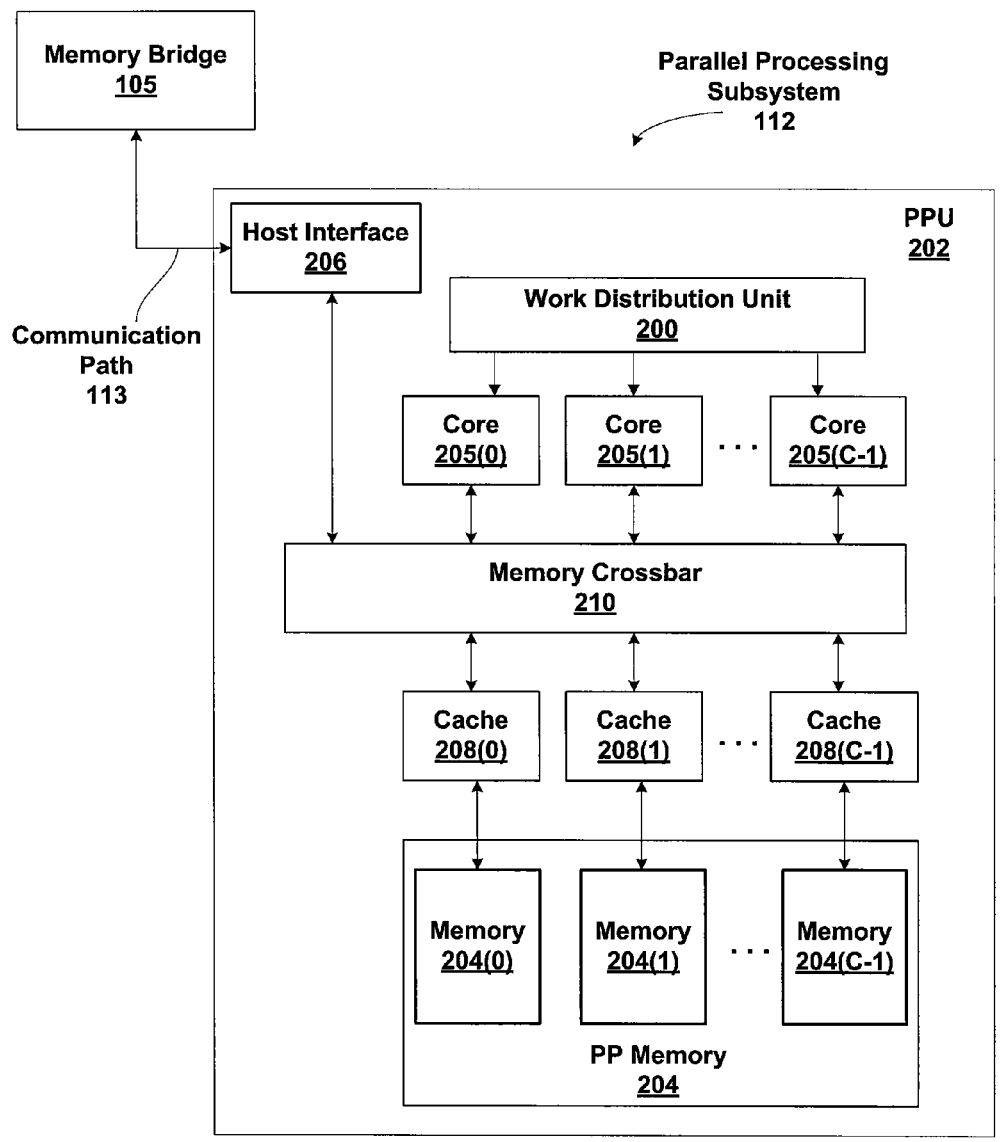
FIG. 2 is a block diagram of a parallel processing subsystem for the computer system of FIG. 1 in accordance with one or more aspects of the present invention.

An embodiment of parallel processing subsystem 112 is shown in FIG. 2. Although only a single parallel processing unit (PPU) 202 is shown in FIG. 2, parallel processing subsystem 112 may include one or more PPUs 202, each of which is coupled to a local parallel processing (PP) memory 204. One or more messages that specify the location of data and program instructions for execution by each PPU 202 may be stored in each PP memory 204. In general, a parallel processing subsystem includes a number U of PPUs, where U≧1. PPU 202 and PP memory 204 may be implemented, e.g., using one or more integrated circuit devices such as programmable processors, application specific integrated circuits (ASICs), and memory devices.

As shown in detail for PPU 202(0), each PPU 202 includes a host interface 206 that communicates with the rest of system 100 via communication path 113, which connects to memory bridge 105 (or, in one alternative embodiment, directly to CPUs 102 or caches 103). In one embodiment, communication path 113 is a PCI-E link, in which dedicated lanes are allocated to each PPU 202 as is known in the art. Other communication paths may also be used. Host interface 206 outputs messages (or other signals) for transmission on communication path 113 and also receives all incoming messages (or other signals) from communication path 113 and directs them to appropriate components of PPU 202. For example, messages related to processing tasks may be directed to a work distribution unit 200 while messages related to memory operations (e.g., reading from or writing to PP memory 204) may be directed to a memory crossbar 210. Host interface 206, work distribution unit 200, and memory crossbar 210 may be of generally conventional design, and a detailed description is omitted as not being critical to the present invention.

Each PPU 202 advantageously implements a highly parallel processor. As shown in detail for PPU 202(0), a PPU 202 includes a number C of cores 205 and corresponding caches 208, where C≧1. Each cache 208 is coupled to a corresponding portion of PP memory 204, shown as a memory 204(0) and 204(1) through 204(C−1). The cache/memory pairs, e.g., cache 208(0) and memory 204(0) do not communicate with each other. Each processing core 205 is capable of executing a large number (e.g., tens or hundreds) of threads concurrently, where each thread is an instance of a program; one embodiment of a multithreaded processing core 205 is described in conjunction with FIG. 3. A processing context encompasses a complete set of state through PPU 202, while a thread may encompass only the state required to shade a single pixel. Threads run inside processing contexts: one processing context might contain thousands of running threads. Cores 208 receive processing tasks to be executed via a work distribution unit 200. Work distribution unit 200 can implement a variety of algorithms for distributing work. For instance, in one embodiment, work distribution unit 200 receives a "ready" signal from each core 205 indicating whether that core has sufficient resources to accept a new processing task. When a new processing task arrives, work distribution unit 200 assigns the task to a core 205 that is asserting the ready signal; if no core 205 is asserting the ready signal, work distribution unit 200 holds the new processing task until a ready signal is asserted by a core 205.

In some embodiments of the present invention, a message implements a remote procedure call (RPC) that includes a bundle of data that is included with the handle of a routine for processing the data. When the data has been processed by cores 205, host interface 206 sends a return message that includes data to CPU 102.

Cores 205 communicate with memory crossbar 214 to read from or write to caches 208 and PP memory 204. In one embodiment, memory crossbar 210 includes an interface adapted to communicate with local PP memory 204, as well as a connection to host interface 206, thereby enabling cores 205 to communicate with system memory 104 or other memory that is not local to PPU 202. Similarly, one or more of CPUs 102 can read from or write to caches 208 and/or PP memory 204 through memory crossbar 210. Importantly, read and write accesses from CPUs 102 pass through host interface 206 which performs memory address translation to convert virtual addresses provided by CPUs 102 into physical memory addresses for caches 208 and PP memory 204.

Cores 205 can be programmed to execute processing tasks relating to a wide variety of applications, including but not limited to linear and nonlinear data transforms, filtering of video and/or audio data, modeling operations (e.g., applying laws of physics to determine position, velocity and other attributes of objects), image rendering operations (e.g., vertex shader, geometry shader, and/or pixel shader programs), and so on. PPU 202 may transfer data from system memory 104, local PP memory 204, and/or caches 208 into internal (on-chip) memory, process the data, and write result messages back to system memory 104, local PP memory 204, and/or caches 208, where such messages can be accessed by other system components, including, e.g., CPUs 102 or another parallel processing subsystem 112.

In some embodiments, some or all of cores 205 in PPU 202 are graphics processors with rendering pipelines that can be configured to perform various tasks related to generating pixel data from graphics data read from a message via memory bridge 105 and bus 113, interacting with caches 208 and local PP memory 204 (which can be used as graphics memory including, e.g., a conventional frame buffer, messages, texture maps, and the like) to store and update pixel data, deliver pixel data to display device 110, and the like. In some embodiments, PP subsystem 112 may include one or more PPU 202 that operate as graphics processors and one or more other PPU 202 that are used for general-purpose computations. The PPUs may be identical or different, and each PPU may have its own dedicated PP memory device(s) or no dedicated PP memory device(s).

Referring back to FIG. 1, in operation, one or more CPUs 102 are the master processors of system 100, controlling and coordinating operations of other system components. In particular, CPUs 102 issue commands that control the operation of PPU 202. In some embodiments, CPUs 102 write a message for each PPU 202 to a buffer (not explicitly shown in FIG. 1), and which may be located in system memory 104, cache 208, PP memory 204, or another storage location accessible to both CPUs 102 and PPU 202. PPU 202 reads the instructions and data from the message and executes commands asynchronously with operation of CPUs 102.

It will be appreciated that the system shown herein is illustrative and that variations and modifications are possible. The connection topology, including the number and arrangement of bridges, may be modified as desired. For instance, in some embodiments, system memory 104 is connected to CPUs 102 directly rather than through a bridge, and other devices communicate with system memory 104 via memory bridge 105 and CPUs 102. In other alternative topologies, parallel processing subsystem 112 is connected to I/O bridge 107 or directly to CPUs 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of PPU 202 to the rest of system 100 may also be varied. In some embodiments, PP system 112 is implemented as an add-in card that can be inserted into an expansion slot of system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

A PPU 202 may be provided with any amount of local PP memory 204, including no local memory, and may use local memory and system memory in any combination. For instance, a PPU 202 can be a graphics processor in a unified memory architecture (UMA) embodiment; in such embodiments, little or no dedicated graphics (PP) memory is provided, and PPU 202 would use system memory exclusively or almost exclusively. In UMA embodiments, a PPU 202 may be integrated into a bridge chip or processor chip or provided as a discrete chip with a high-speed link (e.g., PCI-E) connecting the PPU 202 to system memory, e.g., via a bridge chip.

As noted above, any number of PPU 202 can be included in a parallel processing subsystem. For instance, multiple PPU 202 can be provided on a single add-in card, or multiple add-in cards can be connected to communication path 113, or one or more of the PPU 202 could be integrated into a bridge chip. The PPU 202 in a multi-PPU system may be identical to or different from each other; for instance, different PPU 202 might have different numbers of cores, different amounts of local PP memory, and so on. Where multiple PPU 202 are present, they may be operated in parallel to process data at higher throughput than is possible with a single PPU 202. Systems incorporating one or more PPU 202 may be implemented in a variety of configurations and form factors, including desktop, laptop, or handheld personal computers, servers, workstations, game consoles, embedded systems, and so on.

CPU to Core Communication

Various techniques may be used to transmit messages produced by CPUs 102 to consumers of the messages, such as PPU 202. The messages may contain instructions, command, and/or data. Conventional systems have been configured to have the producer of the data write the messages to system memory or to the consumer's memory, e.g. system memory 104, or PP memory 204, and have the consumer read the messages. Alternatively, the produce writes the messages to cache 103 and the consumer reads the messages from cache 103. In order to ensure that the consumer reads valid messages, the producer writes a value indicating that a message is ready and the consumer polls the ready value, only reading the message when the value indicates that the message is valid.

Assuming that it takes T clock cycles for the producer to write to system memory, i.e., from the initiate of the write until the result is posted in system memory, various relative times can be determined for other memory accesses. T clock cycles are also needed for a processor (producer or consumer) to read from system memory. A typical value for T is 250 clock cycles. 2T clock cycles are needed for a processor to read from or write to another processor's memory, i.e., for CPU 102 to read from or write to PP memory 204. T/5 clock cycles are needed for a processor to read from or write to its own L2 cache, i.e., CPU 102 to read from or write to cache 103 and core 205 to read from or write to cache 208. 6T/5 clock cycles are needed for a processor to read from or write to another processor's cache, i.e., CPU 102 to read from or write to cache 208 and core 205 to read from or write to cache 103. Furthermore, because writes are pipelined, each additional write in a group that is unbroken by a read adds a cost of 1 clock cycle. Reads are not pipelined.

Given the number of clock cycles that are needed for the various read and write operations, a minimum time needed to pass a message of length K may be computed in terms of T for each message transmission technique. TABLE 1 lists the message transmit time for four different configurations. The first column describes the system configuration. The second column specifies the number of clock cycles for the producer of the message to write the message to memory and set the ready value. The third column specifies the number of clock cycles needed for the consumer of the message to read the ready value. The fourth column specifies the number of clock cycles needed for the consumer to read the message from the memory and the fifth column specifies the total number of clock cycles needed for communication of the message between the producer and consumer.

TABLE 1

Message Transmit Times

| System configuration | Write message and set ready | Read ready | Read message | Total |
|---|---|---|---|---|
| Read/Write System memory | $T + K + 1$ | $2T$ | $2KT$ | $2KT + 3T + K + 1$ |
| Read/Write PPU memory | $2T + K + 1$ | $T$ | $KT$ | $KT + 3T + K + 1$ |
| Read/Write CPU cache | $T/5 + K + 1$ | $6T/5$ | $2K * 6T/5 = 12KT/5$ | $12KT/5 + 7T/5 + K + 1$ |
| Read/Write Core cache | $6T/5 + K + 1$ | $T/5$ | $KT/5$ | $KT/5 + 7T/5 + K + 1$ |

In a first system configuration, "read/write system memory," the message producer, CPU 102 writes to system memory 104 and a core 205 reads the message from system memory 104. Since the producer writes its own memory and writes are pipelined, the number of clock cycles needed to write memory and set the ready value is $T+K+1$. Since the consumer needs to read the ready value from the producer's memory, the read takes $2T$ clock cycles. Likewise, since the consumer reads the message from the producer's memory, the message read takes $2KT$ clock cycles.

In a second system configuration, "read/write PPU memory," the message producer, CPU 102 writes to PPU memory 204 and a core 205 reads the message from PPU memory 204. Since the producer writes the consumer's memory and writes are pipelined, the number of clock cycles needed to write memory and set the ready value is $2T+K+1$. Since the consumer needs to read the ready value from its own memory, the read takes $T$ clock cycles. Likewise, since the consumer reads the message from its own memory, the message read takes $KT$ clock cycles. This configuration of communicating between CPU 102 and a core 205 reduces the number of clock cycles by $1KT$ compared with the first system configuration.

In a third system configuration, "read/write CPU cache," the message producer, CPU 102 writes to cache 103 and a core 205 reads the message from cache 103. Since the producer writes its own memory and writes are pipelined, the number of clock cycles needed to write memory and set the ready value is $T/5+K+1$. Since the consumer needs to read the ready value from the producer's cache, the read takes $6T/5$ clock cycles. Likewise, since the consumer reads the message from the producer's cache, the message read takes $2KT*6/5T=12KT/5$ clock cycles. The difference between using the third system configuration for communicating between CPU 102 and a core 205 and the second system configuration is $(7KT-8T)/5$, so when $K>8/7$ (or $K>1$, since K is an integer) the third configuration is faster.

In a fourth system configuration, "read/write core cache," the message producer, CPU 102 writes to cache 208 and a core 205 reads the message from cache 208. Since the producer writes the consumer's cache and writes are pipelined, the number of clock cycles needed to write memory and set the ready value is $6T/5+K+1$. Since the consumer needs to read the ready value from its own cache, the read takes $T/5$ clock cycles. Likewise, since the consumer reads the message from its own cache, the message read takes $KT/5$ clock cycles. This configuration of communicating between CPU 102 and a core 205 reduces the number of clock cycles by $11KT/5$ compared with the third system configuration. Specifically, when T is 250 and K is 16, the third system configuration requires 1012 clock cycles to transfer the message while the fourth system configuration requires only 132 clock cycles. In order to benefit from the quicker transfers, system 100 is configured to transfer messages from CPUs 102 to cores 205 by writing the messages to caches 208, as described in conjunction with FIGS. 5 and 6. Conversely, system 100 is configured to transfer messages from cores 205 to CPUs 102 by writing the messages to caches 103.

Core Overview

Figure 3:
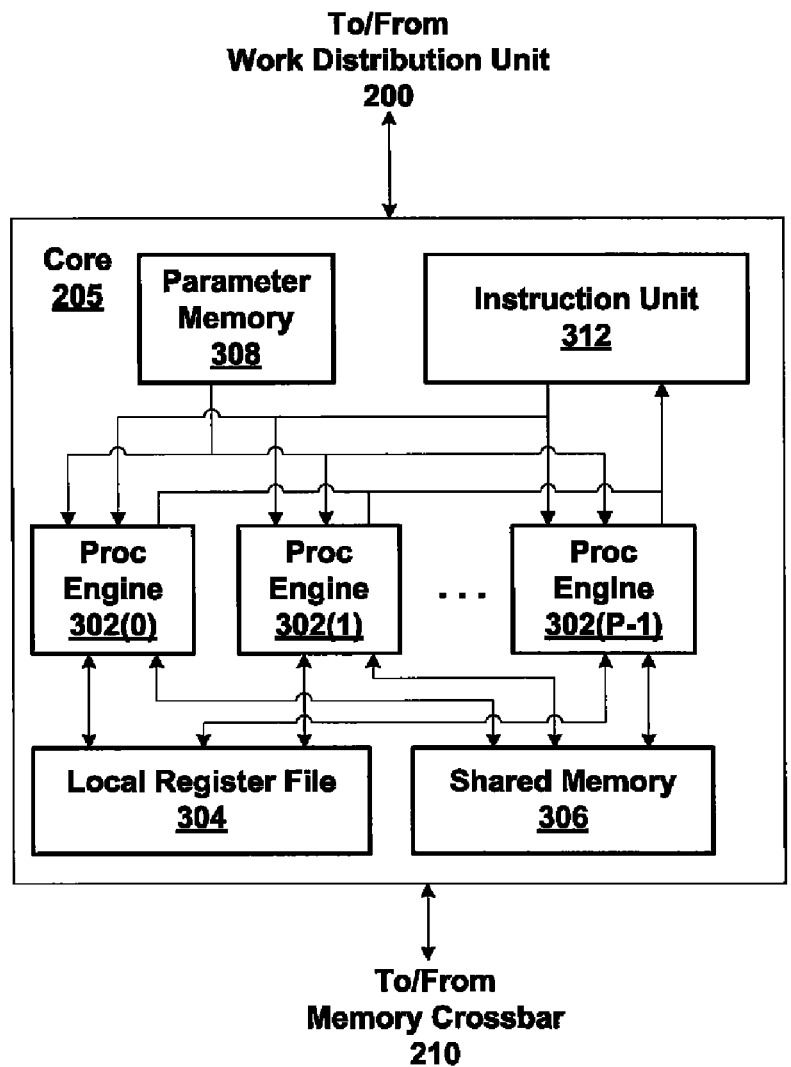
FIG. 3 is a block diagram of a core for the parallel processing subsystem of FIG. 2 in accordance with one or more aspects of the present invention.

FIG. 3 is a block diagram of a core 205 for the parallel processing subsystem 112 of FIG. 2, in accordance with one or more aspects of the present invention. PPU 202 includes a core 205 (or multiple cores 205) configured to execute a large number of threads in parallel, where the term "thread" refers to an instance of a context, i.e., a particular program executing on a particular set of input data. In some embodiments, single-instruction, multiple-data (SIMD) instruction issue techniques are used to support parallel execution of a large number of threads without providing multiple independent instruction units.

In one embodiment, each core 205 includes an array of P (e.g., 8, 16, etc.) parallel processing engines 302 configured to receive SIMD instructions from a single instruction unit 312. Each processing engine 302 advantageously includes an identical set of functional units (e.g., arithmetic logic units, etc.). The functional units may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

Each processing engine 302 uses space in a local register file (LRF) 304 for storing its local input data, intermediate results, and the like. In one embodiment, local register file 304 is physically or logically divided into P lanes, each having some number of entries (where each entry might store, e.g., a 32-bit word). One lane is assigned to each processing engine 302, and corresponding entries in different lanes can be populated with data for different threads executing the same program to facilitate SIMD execution. In some embodiments, each processing engine 302 can only access LRF entries in the lane assigned to it. The total number of entries in local register file 304 is advantageously large enough to support multiple concurrent threads per processing engine 302.

Each processing engine 302 also has access to an on-chip shared memory 306 that is shared among all of the processing engines 302 in core 205. Shared memory 306 may be as large as desired, and in some embodiments, any processing engine 302 can read to or write from any location in shared memory 306 with equally low latency (e.g., comparable to accessing local register file 304). In some embodiments, shared memory 306 is implemented as a shared register file; in other embodiments, shared memory 306 can be implemented using shared cache memory.

In addition to shared memory 306, some embodiments also provide additional on-chip parameter memory and/or cache(s) 308, which may be implemented, e.g., as a conventional RAM or cache. Parameter memory/cache 308 can be used, e.g., to hold state parameters and/or other data (e.g., various constants) that may be needed by multiple threads. Processing engines 302 also have access via memory crossbar 210 to off-chip "global" memory, which can include, e.g., PP memory 204, caches 208, and/or system memory 104, with system memory 104 being accessible by memory crossbar 210 via host interface 206 as previously described. It is to be understood that any memory external to PPU 202 may be used as global memory. Processing engines 302 can be coupled to memory crossbar 210 via an interconnect (not explicitly shown) that allows any processing engine 302 to access global memory.

In one embodiment, each processing engine 302 is multi-threaded and can execute up to some number G (e.g., 24) of threads concurrently, e.g., by maintaining current state information associated with each thread in a different portion of its assigned lane in local register file 304. Processing engines 302 are advantageously designed to switch rapidly from one thread to another so that instructions from different threads can be issued in any sequence without loss of efficiency. Since each thread may correspond to a different context, multiple contexts may be processed over multiple cycles as different threads are issued for each cycle.

Instruction unit 312 is configured such that, for any given processing cycle, an instruction (INSTR) is issued to each P processing engines 302. Each processing engine 302 may receive a different instruction for any given processing cycle when multiple contexts are being processed simultaneously. When all P processing engines 302 process a single context, core 205 implements a P-way SIMD microarchitecture. Since each processing engine 302 is also multithreaded, supporting up to G threads concurrently, core 205 in this embodiment can have up to P*G threads executing concurrently. For instance, if P=16 and G=24, then core 205 supports up to 384 concurrent threads for a single context or N*24 concurrent threads for each context, where N is the number of processing engines 302 allocated to the context.

Operation of core 205 is advantageously controlled via a work distribution unit 200. In some embodiments, work distribution unit 200 receives pointers to data to be processed (e.g., primitive data, vertex data, and/or pixel data) as well as locations of messages containing data or instructions defining how the data is to be processed (e.g., what program is to be executed). Work distribution unit 200 can load data to be processed into shared memory 306 and parameters into parameter memory 308. Work distribution unit 200 also initializes each new context in instruction unit 312, then signals instruction unit 312 to begin executing the context. Instruction unit 312 reads instructions contained in messages and executes the instructions to produce processed data. When execution of a context is completed, core 205 advantageously notifies work distribution unit 200. Work distribution unit 200 can then initiate other processes, e.g., to retrieve output data from shared memory 306 and/or to prepare core 205 for execution of additional contexts.

It will be appreciated that the core architecture described herein is illustrative and that variations and modifications are possible. Any number of processing engines may be included. In some embodiments, each processing engine 302 has its own local register file, and the allocation of local register file entries per thread can be fixed or configurable as desired. In particular, entries of local register file 304 may be allocated for processing each context. Further, while only one core 205 is shown, a PPU 202 may include any number of cores 205, which are advantageously of identical design to each other so that execution behavior does not depend on which core 205 receives a particular processing task. Each core 205 advantageously operates independently of other cores 205 and has its own processing engines, shared memory, and so on.

Graphics Pipeline Architecture

Figure 4:
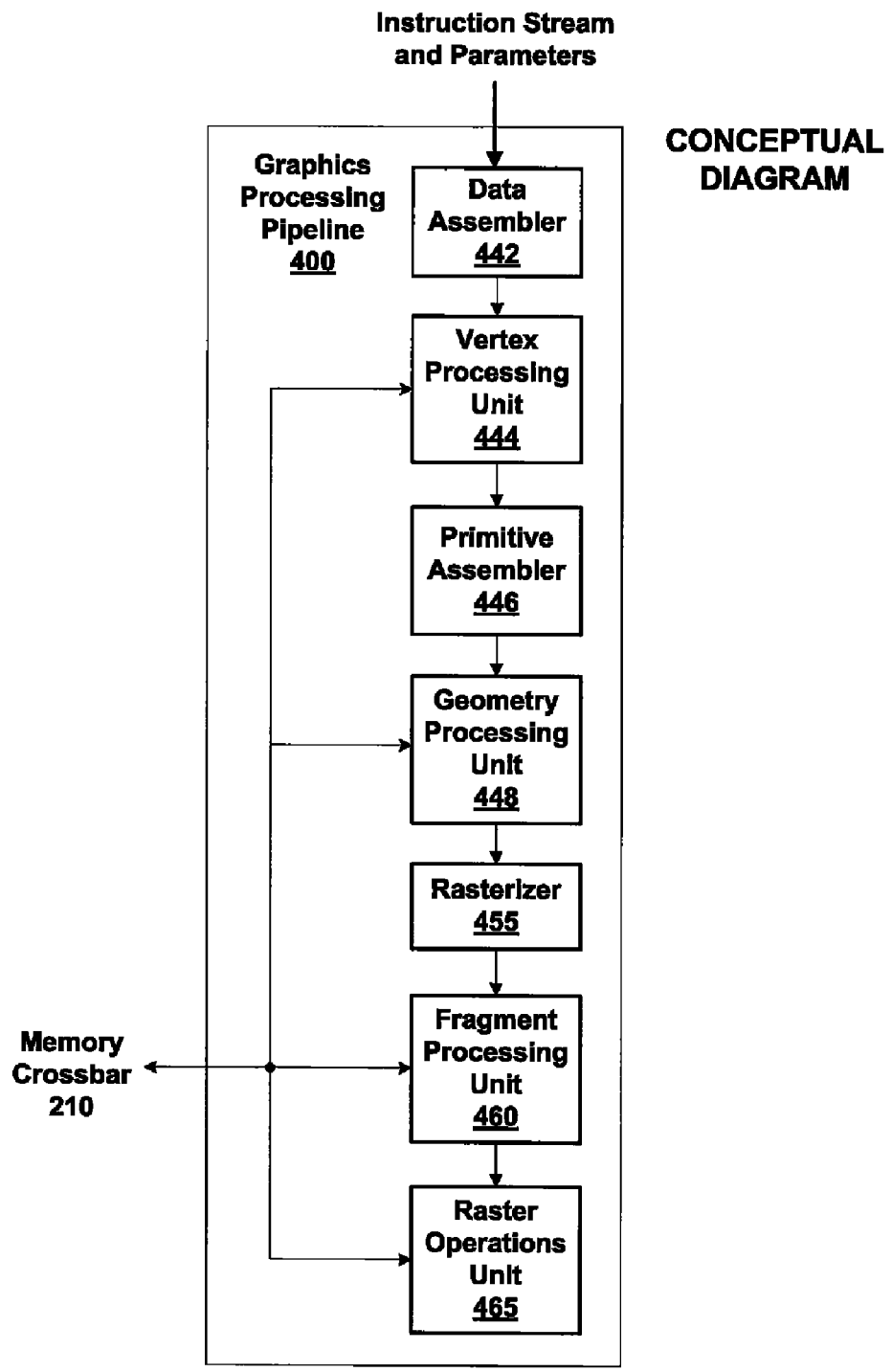
FIG. 4 is a conceptual diagram of a graphics processing pipeline in accordance with one or more aspects of the present invention.

FIG. 4 is a conceptual diagram of a graphics processing pipeline 400, in accordance with one or more aspects of the present invention. PPU 202 may be configured to form a graphics processing pipeline 400. For example, core 205 may be configured to perform the functions of a vertex processing unit 444, geometry processing unit 448, and a fragment processing unit 460. The functions of data assembler 442, primitive assembler 446, rasterizer 455, and raster operations unit 465 may also be performed by core 205 or may be performed by host interface 206. A message may include one or more of a vertex shader program, geometry shader program, and fragment shader program for execution by PPU 202. A message may be written by CPU 102 to caches 208 to efficiently transfer the instructions to PPU 202 for processing. Similarly, data provided by CPU 102 may also be transferred to cache 208 as a message and processed data produced by PPU 202 may be efficiently transferred from PPU 202 to caches 103 as a message.

Data assembler 442 is a fixed function unit that collects vertex data for high-order surfaces, primitives, and the like, and outputs the vertex data to vertex processing unit 444. Vertex processing unit 444 is a programmable execution unit that is configured to execute vertex shader programs, transforming vertex data as specified by the vertex shader programs. For example, vertex processing unit 444 may be programmed to transform the vertex data from an object-based coordinate representation (object space) to an alternatively based coordinate system such as world space or normalized device coordinates (NDC) space. Vertex processing unit 444 may read data that is stored in caches 208 or PP memory 204 through memory crossbar 210 for use in processing the vertex data.

Primitive assembler 446 receives processed vertex data from vertex processing unit 444 and constructs graphics primitives, e.g., points, lines, triangles, or the like, for processing by geometry processing unit 448. Geometry processing unit 448 is a programmable execution unit that is configured to execute geometry shader programs, transforming graphics primitives received from primitive assembler 446 as specified by the geometry shader programs. For example, geometry processing unit 448 may be programmed to subdivide the graphics primitives into one or more new graphics primitives and calculate parameters, such as plane equation coefficients, that are used to rasterize the new graphics primitives. Geometry processing unit 448 outputs the parameters and new graphics primitives to rasterizer 455. Geometry processing unit 448 may read data that is stored in caches 208 or PP memory 204 through memory crossbar 210 for use in processing the geometry data.

Rasterizer 455 scan converts the new graphics primitives and outputs fragments and coverage data to fragment processing unit 260. Fragment processing unit 460 is a programmable execution unit that is configured to execute fragment shader programs, transforming fragments received from rasterizer 455 as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in caches 208 or PP memory 204 through memory crossbar 210 for use in processing the fragment data. Memory crossbar 210 produces read requests for data stored in graphics memory, decompresses any compressed data, and performs texture filtering operations, e.g., bilinear, trilinear, anisotropic, and the like. Raster operations unit 465 is a fixed function unit that optionally performs near and far plane clipping and raster operations, such as stencil, z test, and the like, and outputs pixel data as processed graphics data for storage in graphics memory. The processed graphics data may be stored in graphics memory, e.g., caches 208, PP memory 204, and/or system memory 104, for display on display device 110.

Interprocessor Direct Cache Writes

Figure 5:
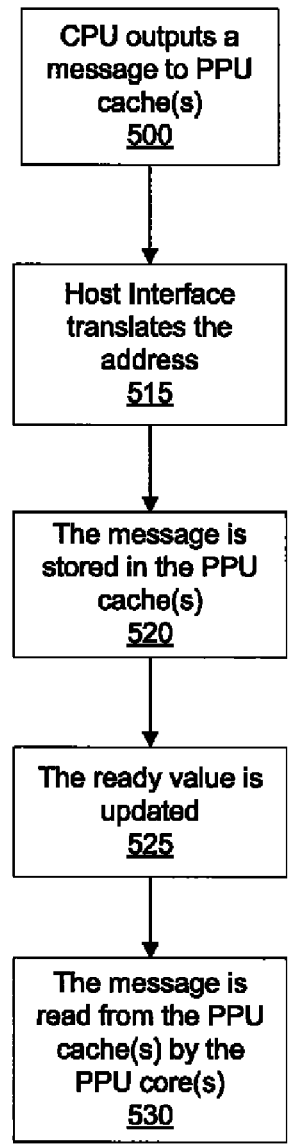
FIG. 5 is a flow diagram of method steps for writing and reading messages in accordance with one or more aspects of the present invention.

FIG. 5 is a flow diagram of method steps for writing and reading messages provided by CPU 102 to PPU 202 for processing, in accordance with one or more aspects of the present invention. In step 500 CPU 102 outputs a message to one or more caches 208. In step 515 host interface 206 translates the virtual address of the message into a physical address for PPU memory 204. In step 520 the message is stored in one or more caches 208. In step 525 the ready signal is written by CPU 102 to indicate that the message is ready to be read. In step 530 one or more cores 205 reads the message from the one or more caches 208 for processing.

By writing the message into the consumer memory, particularly into caches 208, the transfer is performed in fewer clock cycles compared with writing the message into cache 103 or system memory 104 and having cores 205 read the message from cache 103 or system memory 104. Furthermore, since caches 208 are positioned on the memory side of memory crossbar 210 any core 205 can access any cache 208 to read a message. This configuration advantageously permits the addition of cores 205 and corresponding L2 caches 208 by adding ports to memory crossbar 210. Therefore, processor parallelism may be increased to improve overall system processing throughput without increasing the complexity of accessing caches 208.

Figure 6:
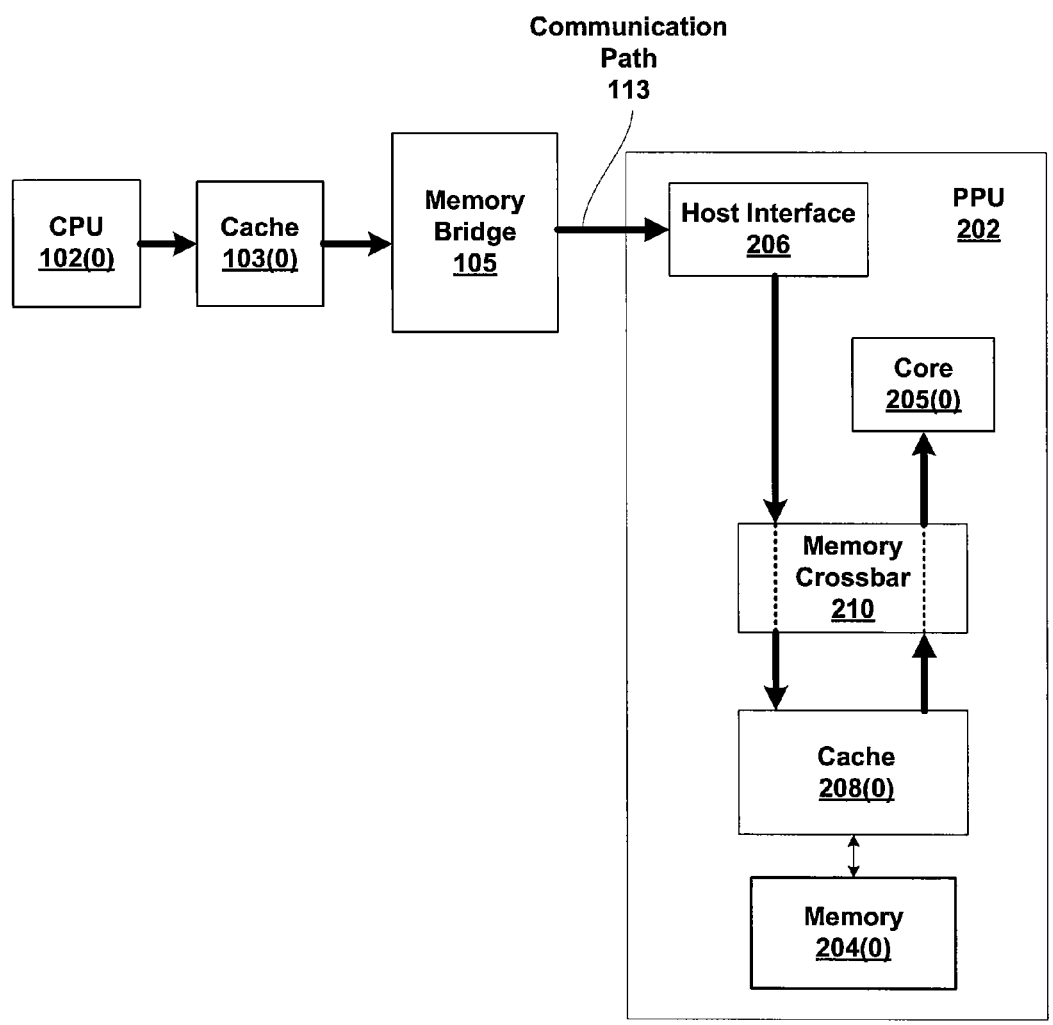
FIG. 6 is a block diagram showing the communication path for transferring a message in accordance with one or more aspects of the present invention.

FIG. 6 is a block diagram showing the communication path for transferring a message, in accordance with one or more aspects of the present invention. CPU 102(0) of FIG. 1 writes a message to PPU 202 by outputting the message to cache 103(0) for routing to PPU 202 via memory bridge 105. The message is output by memory bridge 105 over communication path 113 to PPU 202. Host interface 206 receives the message and translates the virtual address provided with the message to a physical address corresponding to PP memory 0 204(0). Host interface 206 outputs the message with the physical address to memory crossbar 210 for routing to cache 208(0). The message is stored in cache 208(0). The value indicating that a message is ready is also written in cache 208(0). Cache 208(0) may evict the message and write the message to memory 204(0). Importantly, CPU 102 is able to write cache 208 in order to reduce the number of clock cycles needed to transfer messages between CPU 102 and cores 205. Each core 205 may access a cache line in any one of the caches 208 by determining the correct memory controller based on the physical cache line address and then issuing a request directly to the specific cache 208 corresponding to the physical cache line address using the available routing fabric. Therefore, cache misses are not broadcast to all of the cores 205.

The invention has been described above with reference to specific embodiments. Persons skilled in the art, however, will understand that various modifications and changes may be made thereto without departing from the broader spirit and scope of the invention as set forth in the appended claims. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. The foregoing description and drawings are, accordingly, to be regarded in an illustrative rather than a restrictive sense.

The invention claimed is:

1. A method for transmitting messages in a multiprocessor system, comprising:
   outputting a message produced by a central processing unit (CPU) that is coupled to a parallel processing unit only through a system memory bridge directly to a cache associated with a processing core bypassing a system memory, wherein the cache is one of a plurality of caches that reside within the parallel processing unit and the processing core is one of a plurality of processing cores that reside within the parallel processing unit;
   translating a virtual address corresponding to the message into a physical address corresponding to a location in a parallel processing memory that is coupled to the cache;
   storing the message and at least a portion of the physical address in the level 2 cache, wherein the cache may later evict the message and write the message to the parallel processing memory;
   updating a ready value to indicate that the message is available in the cache; and
   reading the message from the cache by the processing core.

2. The method of claim 1, wherein the processing core is configured to perform graphics processing operations to produce an image for display.

3. The method of claim 1, wherein the processing core accesses messages stored in the cache in fewer clock cycles than the processing core accesses messages stored in the system memory that is coupled through the system memory bridge to the CPU.

4. The method of claim 1, wherein the message includes instructions that are configured to be executed by the processing core.

5. The method of claim 1, wherein the message includes image data that is configured to be processed by the processing core.

6. The method of claim 1, wherein the message is routed through a memory crossbar that is configured to route the messages between each processing core of the plurality of processing cores and each cache of the plurality of caches.

7. The method of claim 1, wherein the processing core is further configured to poll the ready value to determine when the message is stored in the cache.

8. The method of claim 1, wherein the message implements a remote procedure call (RPC) that includes a bundle of data that is included with a handle of a routine for processing the data and that the processing core sends a return message that includes the data to the CPU after processing the data.

9. The method of claim 1, further comprising:
   determining a correct memory controller for accessing a cache line based on a physical cache line address; and
   issuing a request directly to a first cache of the plurality of caches that corresponds to the physical cache line address.

10. A multiprocessor system, comprising:
    a parallel processing unit including:
        a plurality of processing cores configured to execute instructions to process data;

a parallel processing memory configured to store messages including the instructions and the data;

a plurality of caches that are coupled to the parallel processing memory and configured to store the messages; and a memory crossbar that is coupled between the plurality of processing cores and the plurality of caches and configured to route the messages between each one of the processing cores and each one of the caches;

a system memory bridge that is coupled between the parallel processing unit and a system memory; and a central processing unit (CPU) that is coupled to the parallel processing unit only through the system memory bridge and configured to produce the messages and write the messages directly to the plurality of caches, bypassing a system memory, wherein the plurality of processing cores are configured to read the messages from the caches and the caches may later evict the messages and write the messages to the parallel processing memory.

11. The system of claim 10, wherein the plurality of processing cores are further configured to process the data to produce processed data and write the processed data to the system memory that is coupled to the CPU through the system memory bridge.

12. The system of claim 10, further comprising a CPU cache that is coupled between the CPU and the system memory bridge and configured to store the messages.

13. The system of claim 12, wherein the plurality of processing cores are further configured to:
process the data to produce processed data and write the processed data to the CPU cache; and
update a ready value to indicate when the processed data is written into the CPU cache.

14. The system of claim 13, wherein the CPU is further configured to update a ready value to indicate when each one of the messages is written into the plurality of caches.

15. The system of claim 13, wherein the plurality of processing cores is further configured to poll the ready value to determine when each one of the messages is stored in the plurality of caches.

16. The system of claim 10, wherein the plurality of the processing cores are configured by the messages to perform graphics processing operations using the data to produce an image for display.

17. The system of claim 10, further comprising additional CPUs that are configured to produce additional messages and write the additional messages to the plurality of caches.

18. The system of claim 10, wherein the CPU is further configured to write the data to the plurality of caches.

19. The system of claim 10, wherein one of the messages implements a remote procedure call (RPC) that includes a bundle of data that is included with a handle of a routine for processing the data and that the plurality of processing cores are further configured to send a return message that includes the data to the CPU after processing the data.

20. The system of claim 10, wherein the plurality of processing cores are further configured to:
determine a correct memory controller for accessing a cache line based on a physical cache line address; and
issue a request directly to one cache of the plurality of caches that corresponds to the physical cache line address.

* * * * *